Feb. 14, 1967 C. D. WRIGHT, JR 3,304,421
AUTOMATIC PROPULSION AND BRAKE CONTROL FOR UNMANNED TRAINS
Filed May 3, 1963 2 Sheets-Sheet 1
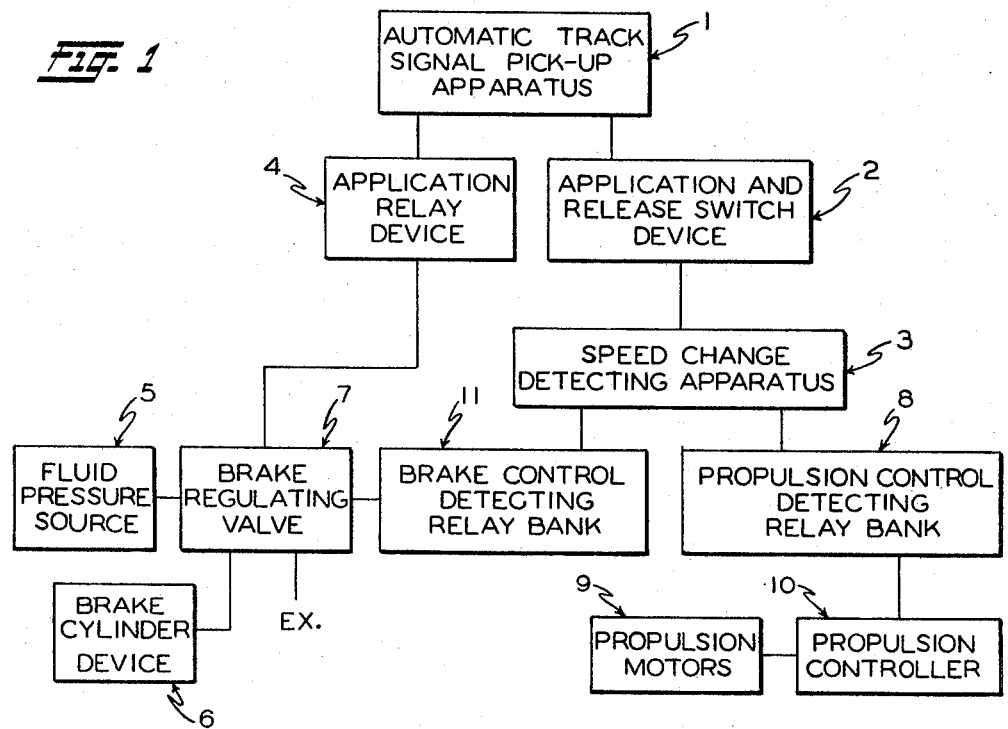
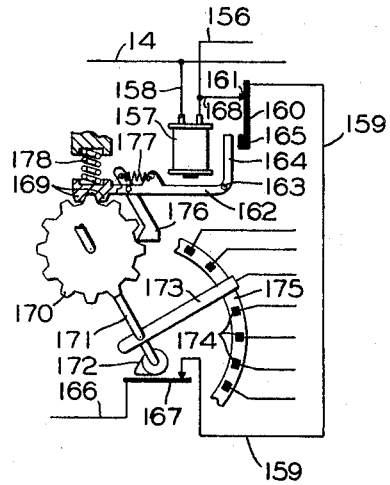
INVENTOR.
Carl D. Wright, Jr.
BY
*A. A. Steinmiller*
Attorney

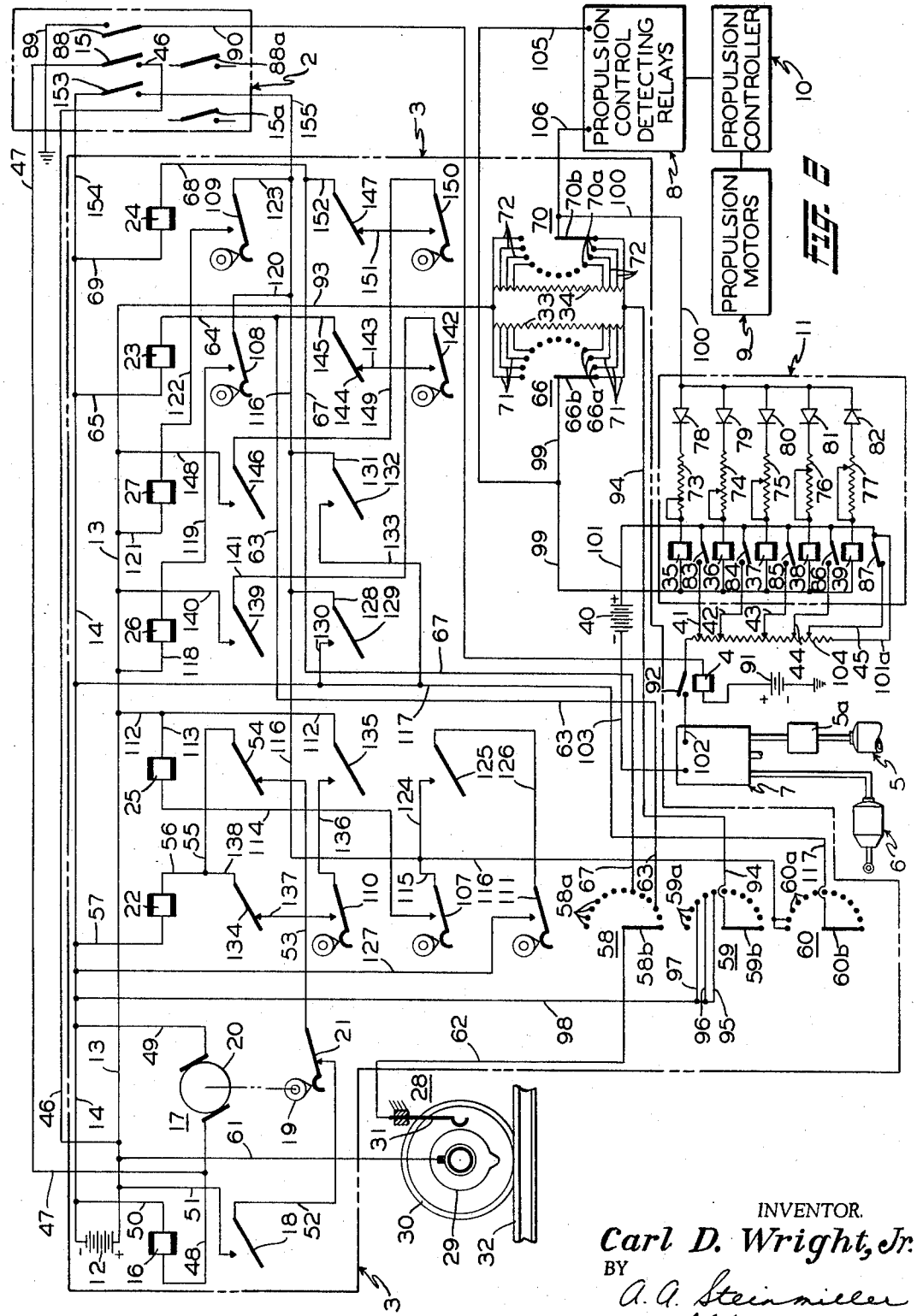

United States Patent Office 3,304,421
Patented Feb. 14, 1967

3,304,421
AUTOMATIC PROPULSION AND BRAKE CONTROL FOR UNMANNED TRAINS
Carl D. Wright, Jr., Pittsburgh, Pa., assignor to Westinghouse Air Brake Company, Wilmerding, Pa., a corporation of Pennsylvania
Filed May 3, 1963, Ser. No. 277,754
11 Claims. (Cl. 246—182)

This invention relates to automatic propulsion and brake control systems for unmanned trains and more particularly to means for determining the rate of acceleration or deceleration of said train to thereby provide the appropriate brake control in accordance with said rates.

In utilization of automatic train braking controls, it is necessary to have a constant appraisal of the rate of change of speed of the trains to accordingly vary the degree of braking and propulsion necessary to maintain the train at a desired speed, at a desired time interval, and at a desired location on the track as determined by various automatic braking and propulsion apparatus.

According to the present invention, there is provided an automatic train speed measuring means capable of determining the rate of acceleration or deceleration of a train during a brake application to correspondingly control the propulsion and the braking of the train at a selected location to a desired predetermined degree in accordance with the train speed.

In the accompanying drawings:

FIG. 1 shows a block diagram of the different basic component devices utilized in the automatic propulsion and brake control system and the interconnectable association therebetween to result in the desired automatic control utilizing the present automatic speed measuring system.

FIG. 2 shows a diagrammatic view of the automatic speed measuring system with the necessary circuitry interconnecing the component elements of the system, and FIG. 3 is an enlarged diagrammatic view of a portion of an example of one of the rotary stepping switches or motor magnets utilized in the system.

DESCRIPTION—FIG. 1

As shown in FIG. 1, the automatic propulsion and braking system includes a track signal pick-up device 1 for receiving a coded track signal from any common wayside or track signalling means (not shown) to initiate the desired braking and propulsion controls responsively thereto. Upon receipt of the appropriate track signals, the aforesaid signal pick-up device 1 effects operation of an application and release switch device 2 which closes an application switch contact and opens a release switch contact (described hereinafter) to initiate operation of the novel speed change detecting apparatus 3 shown in detail in FIG. 2. Simultaneously, the signal pick-up device 1 has effected operation of an application relay device 4 to be energized to a closed position to complete brake applying circuitry to effect supply of fluid under pressure from a source 5 via a reducing valve 5a to the vehicle brakes, represented herein by a brake cylinder device 6, under the control of a brake regulating valve 7 as energized by said brake applying circuitry described hereinafter. In accordance with the rate of change of speed appraisal determined by the detecting apparatus 3 as explained hereinafter, a bank 8 of propulsion control detecting relays is conditioned thereby to effect regulation of the propulsion motors 9 under the control of a propulsion controller 10 (an understanding of which is not necessary to an understanding of the present invention), and simultaneously a bank 11 of brake control detecting relays effects control of the brake regulating valve 7 to assure the desired degree of braking by the brake cylinder device 6 in a manner described in detail hereinafter.

DESCRIPTION—FIG. 2

As shown in FIG. 2, the speed change detecting apparatus includes a source of energy such as a battery 12 which is connected to a supply wire 13 and a return wire 14. An application switch contact 15 of the application and release switch device 2 is closed electrically by any well-known means (not shown) when a brake application is initiated as described previously to thereby complete circuitry described hereinafter for energizing a time delay relay 16 and a recycling timer 17. The time delay relay 16 is constructed such that pickup of the contact 18 thereof is delayed a preselected time (in any well-known manner such as by dash pots) to permit the brake application to be effective throughout the train before closing the contact 18 thereof to start the automatic speed measurements described hereinafter. The energization of the recycling timer 17 (represented herein as a cam 19 shaft-driven by a motor 20) operates a flexible contact 21 to open and close at a predetermined rate of say once each second to cooperatively function with the contact 18 of the time delay relay 16 to supply a pulsating current once every second to the remaining circuitry of the apparatus to sequentially operate the various components thereof in a manner hereinafter described. Said components include a plurality of stepping switches, represented herein by solenoids 22, 23 and 24 with associated contact banks and contacts described hereinafter, which cooperate with homing relays 25, 26 and 27 and their respective contacts in response to operation of a vehicle wheel contact 28 represented by a cam contactor 29 on a vehicle axle or wheel 30 engaging a flexible contactor 31 as the wheel is rolling on the track 32, to perform the speed measurement. Other components of the apparatus include a Wheatstone bridge arrangement, utilizing resistance banks 33 and 34 in cooperation with contact banks of particular stepping switches, to selectively energize one of a plurality of voltage responsive detector relays 35, 36, 37, 38 and 39 of the brake control detecting relay bank 11 to effect operation of the brake regulating valve 7. The brake regulating valve 7 operates, as explained hereinafter, in accordance with different degrees of energization as determined by the said detector relays 35, 36, 37, 38 and 39 supplying voltage thereto from a source 40 by way of one of a plurality of rheostat tap wires 41, 42, 43, 44 and 45 to control a self-lapping solenoid regulating valve means (not shown), to control supply and release of brake controlling fluid of the train brakes, represented herein as a brake cylinder device 6.

The brake regulating valve device 7 is of the variably energized self-lapping solenoid type operably responsive to different degrees of energization thereof to effect different degrees of brake application similar to that shown in U.S. Patent 2,017,689, issued to S. G. Down on October 15, 1935, and assigned to the assignee of the present application. A detailed understanding of such device may be obtained, if desired, from the study of said patent.

The resistance banks 33 and 34 of the Wheatstone bridge arrangement also are utilized in cooperation with the contact banks of particular stepping switches to selectively energize one of a plurality of voltage responsive relays (not shown but similar to that shown in bank 11) of the propulsion control detecting relay bank 8 to effect operation of the propulsion controller 10 which, in turn, operates in a manner, not necessary to an understanding of the present invention, to regulate the propulsion motors 9 concurrently with the regulating of the brake application.

Operation

In operation at a predetermined location such as on a known downgrade, when a brake application is initiated by any conventional means such as operation of a signal pick-up device 1 (FIG. 1), circuitry is completed by the closing of switch 88 (in the application and release switch device 2) from ground wire 89, wire 90, application relay device 4, and battery 91 to effect energization of the application relay device 4. Energization of the application relay device closes a contact 92 thereof and initiates a normal predetermined brake application by energization of the brake regulating valve 7 through circuitry including battery 40, wire 101, closed contact 87, rheostat tap wire 45 and almost all of the rheostat 104 except that portion normally shunted by rheostat tap wire 45 and contact 87 of relay 39, and thence closed contact 92 and wire 102 to the brake regulating valve 7 and wire 103. Simultaneously the application switch contact 15 internally located in the application and release switch device 2 closes to thereby complete circuitry to the speed detecting apparatus 3, said circuitry shown in FIG. 2 including the battery supply 12, supply wire 13, wire 46, closed application switch contact 15, wire 47 and wire 48, to thereby energize the recycling timer 17 by way of wire 49 to the return wire 14, and also energize the time delay relay 16 by way of wire 50 to the return wire 14. The motor 20 and cam 19 of the recycling timer 17 immediately begins to open and close the flexible contact 21 at a predetermined rate of say one opening per second, such that when the time delay relay 16 picks up to close contact 18 thereof (after a time interval adjusted to permit the brakes to apply throughout the train), a pulsating current is supplied by way of supply wire 13, wire 51, closed contact 18 of relay 16, wire 52, pulsating contact 21, wire 53, closed contact 54 of homing relay 25, wire 55, wire 56, stepping switch 22 and wire 57 to the return wire 14, thereby energizing the stepping switch 22 once each second to cause circuit connections in each of its three contact banks 58, 59 and 60 thereof to advance one step each second, in a manner described hereinafter. The contact banks 58, 59 and 60 each comprise a plurality of contact buttons 58a, 59a and 60a, respectively, and also respective wipers 58b, 59b and 60b which operate (responsively to the pulsating energization of the stepping switch 22) one step at a time into engagement with successive contact buttons, in a manner explained hereinafter. All contact buttons of the contact banks shown in the drawing are identified with same reference numeral for each of the respective banks, but for simplicity of illustration the lead lines thereof are shown going to a certain few of the contact buttons.

On the second pulsation of the stepping switch 22 the wiper 58b of contact bank 58 has engaged the second contact button 58a after leaving the "starting" contact button to thereby complete a speed indication circuit including the supply wire 13, wire 61, rotating cam contactor 29 of the wheel contact 28, flexible contactor 31, wire 62, wiper 58b, second contact button 58a, wire 63, wire 64, stepping switch 23 and wire 65 to the return wire 14, to pulsatingly energize the stepping switch 23 once each time the cam contactor 29 engages the flexible contactor 31, such as once for each revolution of the wheel during this second time interval of one second of energization of the stepping switch 22.

The number of pulses effected by the rotating cam contactor 29 during the time that wiper 58b is on the second button 58a is directly proportional to the speed of the vehicle at that second of time, and thus the pulsations supplied to the stepping switch 23 will effect operation of the contact bank 66 thereof in such a manner as to move the wiper 66b successively along the contact buttons 66a thereof during the said one second time interval to a posittion indicative of the speed of the vehicle during that one second time interval. It should be noted that all of contact buttons of the contact bank 66 are identified by the reference numeral 66a, but for simplicity of illustration all buttons are not numbered in the drawings.

Continued operation of the recycling timer 17 effects continued operation of the stepping switch 22, such that the wiper 58b thereof moves off the second button 58a to thereby interrupt the circuitry to the stepping switch 23 and stop the wiper 66b thereof at a position indicative of the vehicle speed during the second time interval of one second.

When the wiper 58b of stepping switch 22 reaches another predetermined contact button 58a, say the fifth contact button, another speed indicating circuit is completed during the fifth second of time, said circuit including the supply wire 13, wire 61, rotating cam contactor 29, flexible contactor 31, wire 62, wiper 58b, fifth contact button 58a, wire 67, wire 68, stepping switch 24 and wire 69 to the return wire 14 to pulsatingly energize the stepping switch 24 once each time the cam contactor 29 makes a revolution to engage the flexible contactor 31 and completes this circuit, which is at a rate directly proportional to the speed of the vehicle during this fifth second of time after a brake application.

The pulsating energization of the stepping switch 24 operates the contact bank 70 thereof in a manner to move the wiper 70b along the contact buttons 70a successively one button at a time responsive to the pulsations effected by the cam contactor 29 rotating proportionately to the vehicle speed during the aforementioned fifth second of time. It should be noted that all of the contact buttons of the contact bank 70 are identified by the reference numeral 70a, but for simplicity of illustration not all such buttons are supplied with reference numerals or lead lines on the drawings.

Continued operation of the recycling timer 17 effects continued operation of the stepping switch 22 such that the wiper 58b thereof moves off the fifth contact button 58b to interrupt the previously described circuitry for pulsatingly energizing the stepping switch 24, thereby stopping the wiper 70b thereof on a particular contact button 70a thereof, indicative of the vehicle speed during the fifth second of time.

As can be seen from the foregoing description of operation, the apparatus is now conditioned such that the stepping switch 23 has positioned its respective wiper 66b on a respective contact button 66a, indicative of the vehicle speed during the second one second time interval after initiation of a brake application throughout the train to result in a first speed indication and the stepping switch 24 has positioned its respective wiper 70b on respective contact button 70a, indicative of a second speed indication of the vehicle speed during the fifth one second time interval or three seconds after the said first speed indication.

Associated with the two series of contact buttons 66a and 70a are respective resistance banks 33 and 34 connected in a Wheatstone bridge arrangement. The particular positioning of the wiper 66b on a particular contact button 66a (as determined by vehicle speed in a manner described) connects a particular one of a plurality of dividing wires 71 to a particular engagement point on the resistance bank 33 such that said engagement point divides the resistance bank 33 into two separate portions to form first and second arms of the Wheatstone bridge arrangement. The dividing wires 71 connect each separate contact button 66a to a selected different engagement point on the resistance bank 33 such that different speed indications effected by the wiper 66b cause different divisions of the resistance bank 33 into different resistance values of the first and second arms of the Wheatstone bridge arrangement. It should be noted herein that for clarity, not all of the dividing wires 71 are shown on the drawing.

Similarly, the particular positioning of the wiper 70b on a particular contact button 70a (as determined by vehicle speed in a manner previously described) connects a particular one of a plurality of dividing wires 72 to a particular engagement point on the resistance bank 34 to divide the resistance bank 34 into two separate selected portions to form third and fourth arms of the Wheatstone bridge arrangement, said division being done proportional to speed indications as previously described. For clarity, not all of the dividing wires 72 are shown in the drawing.

Connected across the Wheatstone bridge arrangement between the two mentioned points of engagement between the first and second arms and between the third and fourth arms is a brake detecting bank 11 of parallel-connected voltage responsive detector relays 35, 36, 37, 38 and 39, each operatively responsive to a different selected voltage that may be supplied from the Wheatstone bridge in accordance with the degree of unbalance of said bridge arrangement when a supply voltage is connected thereto. In operation all the detector relays 35, 36, 37, 38 are operatively energized at a pre-selected high voltage and as the voltage decreases the relays are successively deenergized until the voltage is small and only the relay 38 is energized as explained hereinafter. Associated with each of the detector relays 35, 36, 37, 38 and 39 is a voltage regulating potentiometer 73, 74, 75, 76 and 77, respectively, for pre-regulating the selected voltage at which each of said detector relays is operatively responsive. In series with each of the potentiometers 73, 74, 75, 76 and 77 is a unidirectional current flow device such as rectifiers 78, 79, 80, 81 and 82 to determine to which direction of current flow each of said detector relays may be operatively responsive. Each of the detector relays 35, 36, 37, 38 and 39, when supplied by its own selected voltage applied in its own selected direction, are operable to close their respective contacts 83, 84, 85, 86 and 87 to supply a different selected control voltage to the solenoid (not shown) of the brake regulating valve 7. This control voltage is supplied from the battery 40 via a selected one of aforesaid contacts 83, 84, 85, 86 and 87 to supply a certain voltage to the brake regulating valve 7 as is preregulated by a selected one of the rheostat tap wires 41, 42, 43, 44 and 45 to insert a different portion of rheostat 104 in said circuitry to effect a certain degree of brake application by controlling the degree of energization of the solenoid (not shown) of said brake regulating valve 7 in a well-known manner (see U.S. Patent 2,017,689).

As the recycling timer 17 continues to operate to cause the stepping switch 22 to continue to operate, the wiper 59b thereof, which has been moving in a stepping manner with no effect, will engage the seventh, eighth and ninth contact buttons 59a in the seventh, eighth and ninth seconds of time to complete, during these said three seconds, a circuit for supplying voltage to the Wheatstone bridge arrangement, said circuit including supply wire 13 and wire 93 to the bridge arrangement, and thence by way of wire 94 to wiper 59b, and successively the seventh, eighth and ninth contact buttons 59a, successively wires 95, 96, 97 and wire 98 to the return wire 14 to thereby energize the Wheatstone bridge arrangement.

With the Wheatstone bridge arrangement supplied with voltage as just described, it is entirely dependent on the location of the two wipers 66b and 70b as to which detector relays in the bank 11 connected thereacross will be operatively energized. If the speed indication at the second one second interval of time (hereinafter referred to as the "first reading") is the same as the speed indication at the fifth one second interval of time (hereinafter referred to as the "second reading"), the wipers 66b and 70b will be positioned such that the resistance banks 33 and 34 will be divided exactly in a similar manner, therefore, no voltage will be applied across any of the detector relays of bank 11 to thereby prevent any alteration of the degree of the brake application. If the vehicle speed has increased a large degree between the "first reading" and the "second reading," the wiper 70b will have moved over a greater number of contact buttons 70a than the wiper 66b moved over contact buttons 66a, then the portion of the resistance bank 34 below the dividing point of engagement (the fourth arm) will be greater than the portion of the resistance bank 33 below its dividing point of engagement (the second arm) and correspondingly the portion of resistance bank 34 above the dividing point of engagement (the third arm) will be smaller than the portion of resistance bank 33 above the dividing point of engagement (the first arm) thereby causing an unbalance of the bridge arrangement to cause a voltage potential to be applied to the bank 11 of detector relays by way of wires 99 and 100. The greater the difference between the "first reading" and the "second reading," the greater will be the unbalance of the bridge and correspondingly the greater will be the voltage potential applied to the wires 99 and 100 and to the bank 11 of detector relays.

Depending on the voltage potential applied across the wires 99 and 100, a varying number of the detector relays 35 to 38 are operatively energized. However, operation of all relays except that one relay operatively responsive to the highest voltage is immaterial inasmuch as only the one relay performs the effective resistance shunting function for rheostat 104, as more fully explained hereafter.

If the unbalance in voltage is large due to a greater increase in speed between two successive readings, then the corresponding voltage applied to the detector bank will cause pick up of all relays 35 thru 38. Relay 35, however, which requires the highest voltage for pick-up provides the determining shunt connection to rheostat 104, the shunt connections established to rheostat 104 by the other relays 36, 37 and 38 being immaterial as they are merely in parallel with the shunt connection provided by relay 35.

When relay 35 is operably energized to pick up, it closes a circuit therethrough from a battery supply 40 and wire 101, closed contact 83, rheostat tap wire 41 set to utilize only a relatively small amount of rheostat 104 as compared to the other rheostat tap wires 42, 43 and 44, closed contact 92, a wire 102 leading to a braking regulating valve 7 and back to battery 40 by way of wire 103 to effect a comparatively large degree of energization of the solenoid (not shown) therein due to the small value of rheostat 104 being included in the circuit to thereby effect a large increase in the degree of braking by the brake regulating valve 7 by means not necessary to an understanding of the present invention, but readily understood, if desired, by a study of the previously mentioned U.S. Patent 2,017,689.

Correspondingly, if the unbalance of the Wheatstone bridge arrangement is small due to only a small increase in the speed between the two readings, then the voltage applied to the bank 11 of detector relays is small such that only the detector relay operably responsive to this low voltage, say detector relay 38, will be rendered operable to supply a smaller voltage to the brake regulating valve 7 by way of a battery supply 40, wire 101, closed contact 86, rheostat tap wire 44 set to utilize a relatively high amount of rheostat 104, closed contact 92 and wire 102 to supply only a small degree of energization to the solenoid (not shown) of the brake regulating valve 7 to effect only a slight increase of braking thereby. Similarly, detector relays 36 and 37 are operable responsive to different voltages effected by different speed changes to supply different voltages to the brake regulating valve 7 by way of wires 101, closed contacts 84 and 85 respectively, rheostat tap wires 42 and 43 respectively to different amounts of rheostat 104, closed contact 92 and wire 102 to effect correspondingly supply of different degrees of energization of the solenoid (not shown) of the brake regulating valve 7 to cause different increased degrees of braking thereby.

On downgrade braking as initially automatically effected by the application relay device 4 upon receipt of a signal from the signal pickup of device 1, if the speed has decreased between the "first reading" and the "second reading" due to too much braking, the bridge arrangement will again be unbalanced, however, the current supplied to the bank 11 of detector relays will be in the opposite direction such that only the detector relay 39 with the reversed rectifier 82 can be rendered operable at a preset voltage, to open the normally closed shunting contact 87 thereof. Opening shunting contact 87 opens the normally closed shunting circuit including rheostat tap wire 45 and contact 87 and substitute wire 101a which thereby increases the amount of rheostat 104 in the circuitry over that normally in the braking circuitry to thereby supply a decreased voltage to the brake regulating valve 7 by way of rheostat 104 in its entirety to decrease the normal degree of energization of the solenoid (not shown) in the brake regulating valve 7 to, in turn, effect a decrease in the amount of braking effected thereby. A plurality of parallel-connected detector relays each in series with a reversed rectifier could be employed instead of the single relay and rectifier 39 and 82, if desired, to effect different degrees of reduction of the brake application, responsively to different degrees of current flow in the opposite direction caused by slowing of the vehicle due to too much braking.

While not shown herein, it can thus be seen that with different preselected combinations of detector relays responsively operated by different voltages and of selected polarity, a wide selection of different braking controls can be obtained by receipt of different track signals to effect closing of different sets of contacts such as 15a and 88a shown in the application and release switch device 2 (not illustrated as connected to alternate apparatus) to initiate different braking applications as desired for different locations, and different brake demanding situations to selectively either slow a vehicle, stop it, or merely maintain a safe speed such as desired on a downgrade.

In a similar manner, a parallel bank 8 of paralleled propulsion control detector relays (shown only in outline at 8) are connected by wires 105, 106 to wires 99 and 100 to similarly selectively regulate a propulsion controller 10, simultaneously with regulation of the braking, to control the propulsion motors 9 in a suitable manner, an understanding of which is not necessary to an understanding of the present invention.

After the three second time interval during which the bridge arrangement is supplied with a voltage and the so-called "readout" of the detector relays has occurred, the continued operation of the recycling timer 17 effects continued operation of the stepping switch 22 such that the wiper 60b engages the last two contact buttons 60a in the contact bank 60 to complete three parallel circuits for energizing the "homing" relays 25, 26 and 27 by way of three separate cam operated switches 107, 108 and 109 in a manner described hereinafter. The switches 107, 108 and 109 are associated with the stepping switches 22, 23 and 24, respectively, and are operated, by means shown herein as a cam, to an open position only when the respective wipers of the respective switch banks are in their "home" or "starting" position on the corresponding "starting" contact button. Switches 110 and 111 associated with stepping switch 22 are of the same nature as switches 107, 108 and 109, that is, opened only when the wipers thereof are in the starting position.

Circuitry for energizing the "homing" relay 25 includes supply wire 13, wire 112, wire 113, "homing" relay 25, wire 114, closed cam operated switch 107, wire 115, wire 116, the last two in the series of contact buttons 60a of the switch bank 60, wiper 60b, and wire 117 to the return wire 14. Circuitry for energizing the "homing" relay 26 includes supply wire 13, wire 118, "homing" relay 26, wire 119, closed cam operated switch 108, wire 120, wire 116, the last two in the series of contact buttons 60a, wiper 60b and wire 117 to the return wire 14. Circuitry for energizing "homing" relay 27 includes wire 121, relay 27, wire 122, closed cam operated switch 109 and wire 123 to wire 116 and thence to return wire 14 through the switch bank 60 as described previously with circuitry for "homing" relays 25 and 26.

It should be noted that the circuitry just described for initially energizing each of the homing relays included the wiper 60b of the stepping switch 22, however, as soon as the stepping switch 22 starts to "home" as explained hereinafter, the wiper 60b will be moved off the last two contact buttons 60a which are also included in the described energizing circuits for each of the homing relays, such that it would cause interruption of these circuits previously described. In order to prevent this deenergization of the "homing" relays, a separate parallel stick circuit is included for each homing relay immediately upon energization thereof to maintain energization of said relays during the homing of the associated stepping switches. The stick circuit for homing relay 25 parallels the contact buttons 60a by including wire 124, closed contact 125 of the "homing" relay 25, wire 126, closed cam operated switch 111 and wire 127 to the return wire 14. This stick circuit is interrupted by the opening of the cam operated switch 111 when the stepping switch 22 is "homed" to thereby deenergize the homing relay 25. The stick circuit for homing relay 26 parallels the contact buttons 60a by including wire 118, relay 26, wire 119, closed cam operated contact 108, wire 120, wire 116, wire 128, closed contact 129 of relay 26, wire 130 and wire 117 to the return wire 14. This stick circuit is interrupted by the opening of the cam operated switch 108 when the stepping switch 23 is homed to thereby deenergize the homing relay 26. The stick circuit for relay 27 includes wire 121, relay 27, wire 122, cam operated contact 109, wire 123, wire 116, wire 131, closed contact 132, wire 133 and wire 117 to return wire 14. This stick circuit is interrupted by the opening of cam operated switch 109 when the stepping switch 24 is homed to thereby deenergize the homing relay 27.

With the "homing" relay 25 energized by either the initially described circuitry or by the just-described stick circuits, the contact 54 thereof will be opened to interrupt the supply of pulsating voltage (effected by the recycling timer 17) to the stepping swich 22 to thereby deenergize said stepping switch 22 and permitting the self-interrupting contact 134 thereof to close for reasons discussed hereinafter. Energizing the "homing" relay 25 also closes the contact 135 thereof to complete a "homing" circuit for stepping switch 22 from the supply wire 13 by way of wire 112, closed contact 135, wire 136, closed cam operated contact 110, wire 137, closed self-interrupting contact 134 of stepping switch 22, wire 138 and wire 56 to the stepping switch 22 and thence by way of wire 57 to the return wire 14. This circuit for homing the stepping switch 22 is maintained complete only very briefly due to the fact that the contact 134 included in said circuitry is self-interrupting, such that the energization of said stepping switch 22 is completed and then immediately interrupted upon pickup of contact 134, and then immediately completed again upon drop-out of contact 134 in a rapid pulsating manner. This rapid pulsating energization of the stepping switch 22 causes the wipers 58b, 59b and 60b all to advance counterclockwise across all of their respective contact buttons 58a, 59a and 60a in a rapid manner and continue to advance off the contact buttons in a counterclockwise manner until they each engage the first contact button in their "home" or "starting" position. Once the stepping switch has been "homed," the cam operated switch 110 opens to interrupt the "homing" circuit just described for stepping switch 22, and the cam operated switches 107 and 111 interrupt the previously described circuitry for energizing the homing relay 25, thereby conditioning the stepping switch 22 and homing relay for a new cycle of operation.

Simultaneously, energizing the "homing" relay 26 closes the contact 139 thereof to complete circuitry including supply wire 13, wire 140, closed contact 139, wire 141, closed cam operated switch 142 (open only when the stepping switch 23 is "homed"), wire 143, self-interrupting contact 144, wire 145 and wire 64 to supply a rapid pulsating voltage to the stepping switch 23 due to the rapid opening and closing of the self-interrupting contact 144 thereof which will cause said switch to "home" in a manner similar to the described homing action of stepping switch 22. With stepping switch 23 being "homed," the wiper 66b will be returned counter-clockwise completely around to its "home" or starting position as initially conditioned. Once the stepping switch 23 is "homed," the cam operated contact 142 is opened to thereby insure interruption of the "homing" circuit for energizing the stepping switch 23, and the cam operated switch 108 interrupts the energizing circuit for homing relay 26.

Similarly and simultaneously, energizing the "homing" relay 27 closes the contact 146 thereof to complete circuitry for supplying a rapidly pulsating voltage to the stepping switch 24 (due to the self-interrupting contact 147 thereof) to effect a similar "homing" of said stepping switch 24 and return of the wiper 70b clockwise completely around to its "home" or initial starting position. The circuitry for "homing" stepping switch 24 includes wire 148, closed contact 146, wire 149, closed cam operated switch 150 (open only when stepping switch 24 is "homed"), wire 151, self-interrupting contact 147 of stepping switch 13, wire 152 and wire 68 to the switch 24 and thence to return wire 14 by way of wire 69. Cam operated contact 150 will open when the stepping switch 24 is "homed," thereby insuring interruption of the "homing" circuitry for energizing said stepping switch 24.

With all the stepping switches simultaneously "homed" as just described, if the brake application is still maintained, the recycling timer 17 continues to operate and the whole operation just described will again be initiated and run through each phase as long as the application switch contact 15 remains closed during a brake application.

When the signal pick-up device 1 receives appropriate track signals to initiate a brake release by effecting de-energization of the application relay device 4 by means not shown to open the brake circuit at contact 92, the application and release switch device 2 is simultaneously conditioned such that the application switch contact 15 is opened and the release switch contact 153 is closed by electrical means (not shown), to thereby interrupt the circuitry to the recycling timer 17 and the time delay relay 16 to stop the supply of pulsating voltage (as previously described) to the apparatus. Simultaneously, the closing of the release switch contact 153 completes circuitry from the return wire 14, wire 154, switch contact 153 and wire 155 to wire 116 and thence by wires 115, 120 and 123 through the respective closed cam operated switches 107, 108 and 109 to each of the "homing" relays 25, 26 and 27 to thereby energize each of said relays by circuitry previously described and effect "homing" of each of the stepping switches 22, 23 and 24 as described previously, such that the apparatus will be conditioned in readiness for a new cycle of operation upon initiation of the next brake application.

DESCRIPTION—FIG. 3

An enlarged view of one type of stepping switch is shown in FIG. 3 representative of each of the stepping switches 22, 23 and 24 of FIG. 2. Other types of this switch may be used; however, the type shown herein is preferred. Said stepping switch comprises a supply lead 156 by which the pulsating voltage is supplied (as from the recycling timer or the wheel contactor) to a solenoid 157 and thence by way of a return lead 158 to a return wire, in this instance return wire 14. In parallel with the supply lead 156 is another energizing circuit for the solenoid 157 comprising a homing lead 159 connected to a flexible self-interrupting contactor 160 which normally engages a contact 161 leading to the solenoid 157 and from there by way of a return lead 158 to the return wire 14. Located directly below the solenoid 157 is a pivotally mounted armature arm 162, shaped like an L laid on its side, which is subject to the magnetic forces of the solenoid 157 when energized, to be pivoted clockwise about a pivot point 163 in the apex of the L in a manner such that an interrupter end 164 on the upper end thereof engages an insulated tip 165 on the outer end of the flexible contactor 160 to move said contactor 160 out of engagement with the contact 161 and thereby self-interrupt a homing circuit, hereinafter described, to the solenoid 157. The homing circuit includes a lead 166, a normally closed cam operated switch 167 (open only when the stepping switch is in the "home" position), a homing lead 159, flexible contactor 160, contact 161, wire 168, solenoid 157 and return lead 158 to the return wire 14.

Located on the opposite end of the L-shaped armature arm 162 are a pair of stopping teeth 169 for engaging a single tooth of a gear toothed ratchet wheel 170 which, when rotated, rotates the switch shaft 171 to thereby rotate the switch operating cams 172 (only one of which is shown) and the wiper 173 on the contact buttons 174 (for simplicity not all supplied with lead lines in the drawing) of the switch bank 175. A pawl mechanism comprising a pawl 176 is pivotally mounted on the said opposite end of the armature arm 162 such that a spring 177 suitably connected thereto from the said arm 162 maintains said pawl in engagement with the teeth of the ratchet wheel 170. A driving spring 178 biases said armature arm 162 downward away from the solenoid 157 about the pivot point 163 with a force sufficient to cause the ratchet wheel to be rotated (clockwise as shown in FIG. 3) through the medium of the pawl 176 when the solenoid 157 is deenergized but with insufficient force to overcome the magnetic forces of the solenoid 157 when energized.

The flexible contactor 160 of FIG. 3 represents the self-interrupting contacts 134, 144 and 147 of the respective stepping switches 22, 23 and 24 of FIG. 2. The normally closed contact switch 166 of FIG. 3 represents the switches 110, 142 and 150 of the respective stepping switches 22, 23 and 24 of FIG. 2. Switches 107, 108, 109, 110, 111, 142 and 150 of FIG. 2 are all similar to the switch 167 of FIG. 3 and are open only when the respective stepping switch is in its "home" or starting position by means of the cam 172. A plurality of cams 172 may be provided to open a plurality of switches as is necessary.

OPERATION—FIG. 3

When the solenoid 157 is energized, the armature arm 162 is picked-up against the forces of the driving spring 178 such that the stopping teeth 169 are out of engagement with the teeth on the ratchet wheel 170. As the armature arm is picked-up, the pawl 176 rides over one, and only one, tooth of the ratchet wheel (in a counter-clockwise direction as viewed in FIG. 3) and remains there as long as the solenoid is energized. Upon deenergization of the solenoid 157, as effected by pulsating voltage if the solenoid 157 is energized from supply lead 156 or by the self-interrupting homing circuit from homing lead 159, the driving spring 178 pivots the armature arm downward (in a counterclockwise direction as viewed in FIG. 3) such that the pawl 176 forces the ratchet wheel 170 to be rotated (in a clockwise direction as viewed in FIG. 3) the travel distance of one tooth, at which time the stopping teeth 169 engage one tooth of the ratchet wheel and prevent further rotation of the ratchet wheel 170. With rotation of the ratchet wheel the travel distance of one tooth, the switch shaft 171 moves the wiper 173 from one contact button 174 of the switch bank 175 to the next successive contact button.

It can thus be seen that each time the solenoid 157 is energized and deenergized, the wiper 173 will advance one contact button 174. If the solenoid is energized from the supply lead 156, the number of pulsations of voltage therefrom (as effected by the wheel contactor 28 of FIG.

2) will be counted by the number of steps of advancement of the wiper 173. If the solenoid 157 is energized from the homing circuit by lead 166 and homing lead 159, the self-interrupting flexible contactor 160 will cause the solenoid to be energized and deenergized repeatedly to advance the wiper completely around to its starting or "home" position at which time the cam 172 will break the "homing" circuit and stop further intermittent energization of the solenoid 157 by the homing circuit, thereby conditioning the stepping switch for a new counting cycle.

Having now described the invention, what I claim as new and desire to secure by Letters Patent, is:

1. Automated train control apparatus for unmanned trains of the type utilizing trackside control signals, said apparatus comprising in combination:
   (a) signal pick-up means operably responsive to receipt of trackside signals to initiate various predetermined train control operations,
   (b) braking means for braking a train,
   (c) propulsion means for propelling the train,
   (d) control means operable responsively to operation of said signal pick-up means for initiating a brake application by said braking means and controlling said propulsion means,
   (e) speed-change sensing means for repeatedly providing a selected control voltage indicative of the amount of difference in the speed of the train during two successively spaced intervals of time, and
   (f) regulating means controlled by a control voltage supplied by said speed-change sensing means for so controlling said control means as to cause variation of the degree of braking effected by the braking means and to cause variation of the degree of propulsion effected by the propulsion means so as to maintain a constant speed.

2. Automated train control apparatus for unmanned trains of the type utilizing trackside control signals, said apparatus comprising in combination:
   (a) signal pick-up means operably responsive to receipt of trackside signals to initiate various predetermined train control operations,
   (b) braking means for braking a train,
   (c) control means operable responsively to operation of said signal pick-up means for initiating a brake application by said braking means,
   (d) speed-change sensing means for repeatedly comparing two successive instantaneous speeds and providing a control voltage proportional to and in correspondence with the differential between the two successive instantaneous speeds, and
   (e) regulating means controlled by said control voltage provided by said speed-change sensing means for so controlling said control means as to cause such variation of the degree of braking effected by the braking means as to maintain a substantially constant train speed.

3. Automated train control apparatus for unmanned trains of the type utilizing trackside control signals, said apparatus comprising in combination:
   (a) signal pick-up means operably responsive to receipt of trackside signals to initiate various predetermined train control operations,
   (b) braking means for braking a train,
   (c) control means operable responsively to operation of said signal pick-up means for initiating a brake application by said braking means,
   (d) electro-responsive relay valve means operably responsive to a variable control voltage to vary the degree of application of the braking means, according to the degree of the control voltage,
   (e) speed-change sensing means for repeatedly comparing two successive instantaneous speeds and providing a differential voltage proportional to and in correspondence with the differential between two successive instantaneous speeds, and
   (f) means selectively responsive according to the degree of the differential voltage for correspondingly varying the said control voltage for regulating the degree of energization of said electro-responsive relay valve means for so controlling the degree of brake application as to maintain the speed unchanged from that in effect at the time a trackside signal is received by said signal pick-up means.

4. Automated train control apparatus for unmanned trains of the type utilizing trackside control signals, said apparatus comprising in combination:
   (a) signal pick-up means operably responsive to receipt of trackside signals to initiate various predetermined train control operations,
   (b) braking means for braking a train,
   (c) control means operable responsively to operation of said signal pick-up means for initiating a brake application by said braking means,
   (d) electro-responsive relay valve means operably responsive to a control voltage variable to alter the degree of application of the braking means according to the degree of the control voltage,
   (e) speed-change sensing means for repeatedly comparing two successive instantaneous speeds and providing a differential voltage proportional to and of a polarity in correspondence with the differential between the two successive instantaneous speeds, and
   (f) means selectively responsive according to the degree and polarity of the differential voltage for correspondingly regulating the degree of energization of said electro-responsive relay valve means by said control voltage for so controlling the brake application as to maintain the speed unchanged from that at which it was upon receipt of track signals by said signal pick-up means.

5. Automated train control apparatus for unmanned trains of the type utilizing trackside control signals, said apparatus comprising in combination:
   (a) signal pick-up means operably responsive to receipt of trackside signals to initiate various predetermined train control operations,
   (b) braking means for braking a train,
   (c) propulsion means for propelling the train,
   (d) control means operable responsively to operation of said signal pick-up means for controlling a brake application by said braking means and controlling said propulsion means,
   (e) speed-change sensing means for repeatedly comparing two successive instantaneous speeds and providing a differential voltage proportional to and of a polarity in correspondence with the differential between the two successive instantaneous speeds, and
   (f) means selectively responsive according to the degree and polarity of the differential voltage for correspondingly regulating the control means so as to cause variation of the degree of braking effected by the braking means and variation of the degree of propulsion effected by the propulsion means, thereby to maintain a constant speed of the train.

6. An automated train control apparatus as claimed in claim 1, further characterized in that said speed-change sensing means comprises:
   (a) pulsating voltage supplying means operable responsively to initiation of a brake application to supply a voltage pulsating at a constant predetermined frequency,
   (b) a first stepping switch means operably responsive to said constant frequency voltage to repeatedly sequentially establish a plurality of operating circuits,
   (c) means for providing a voltage pulsating at a frequency proportional to train speed,
   (d) second stepping switch means operably responsive to the voltage pulsating at a frequency proportional to train speed on establishment of one of said operating circuits by said first stepping switch means to condition a first speed indicating circuit to be effective upon subsequent energization by a second one of said operating circuits to supply a first indicating voltage proportional to the speed of the train at the time of establishment of said one of said operating circuits, (e) third stepping switch means operably responsive to a voltage pulsating at a frequency proportional to train speed on establishment of a third one of said operating circuits by said first stepping switch means to condition a second speed indicating circuit to be effective upon subsequent energization by said second one of said operating circuits to supply a second indicating voltage proportional to the speed of the train at the time of establishment of said third one of said operating circuits, and (f) said regulating means being controlled according to the degree of differential of the said first and second indicating voltages to correspondingly vary the degree of the brake application and the propulsion so as to maintain a substantially constant speed.

7. An automatic train control apparatus as claimed in claim 1, further characterized by:

(a) time delay means operably responsive to initiation of a brake application by said control means for rendering said speed-change sensing means ineffective for a time interval not less than the time required for said brake application to become effective throughout the train.

8. An automatic train control apparatus as claimed in claim 6, further characterized in that said first stepping switch means includes:

(a) a contact arm positionable responsively to energization of said first stepping switch means by said voltage pulsating at a constant frequency to move from an initial home position successively through a plurality of other positions to successively establish and interrupt sequentially a plurality of operating circuits and a homing circuit, and (b) homing relay means operatively energizable responsively to establishment of said homing circuit to cause operation of said first stepping switch to return its said contact arm to its initial home position.

9. An automatic train control apparatus as claimed in claim 8, characterized in that said second and third stepping switch means each includes:

(a) a contact arm movable responsively to energization of said second and third stepping switch means respectively by the voltage pulsating at a rate proportional to train speed as supplied by said means via said one of said operating circuits and said third one of said operating circuits respectively from an initial home position successively through a plurality of other positions to a certain one of said other positions indicative of and conditioning said first speed indicating circuit and said second speed indicating circuit respectively, and (b) homing relay means for each of said second and third stepping switch means operatively energizable responsively to establishment of said homing circuit by said first stepping switch means to cause operation of said second and third stepping switch means to return the contact arm of each of said second and third stepping switch means to their respective initial home position.

10. Speed-change appraisal apparatus for use in a train of cars, said apparatus including in combination:

(a) means for supplying a voltage pulsating at a constant predetermined frequency, (b) means providing a voltage pulsating at a frequency proportional to train speed, (c) first stepping relay means operably responsive to said voltage pulsating at a constant predetermined frequency to selectively establish a plurality of operating circuits sequentially for predetermined time intervals.

(d) a first speed indicating circuit, (e) second stepping switch means operably responsive to said speed proportional pulsating voltage as supplied thereto via a first one of said operating circuits for conditioning said first speed indicating circuit, (f) a second speed indicating circuit, (g) third stepping switch means operably responsive to said speed proportional pulsating voltage as supplied thereto via a second one of said operating circuits for conditioning said second speed indicating circuit, (h) said first stepping switch means being effective when it establishes a third one of said plurality of operating circuits to cause energization of said first and said second speed indicating circuits, and (i) control means operably responsive to the differential in potentials established in said first and said second speed indicating circuits.

11. Speed-change appraisal apparatus for use in a train of cars, said apparatus including in combination:

(a) means for supplying a voltage pulsating at a constant predetermined frequency, (b) a first stepping switch means operably responsive to said constant frequency voltage to repeatedly sequentially establish a plurality of operating circuits, (c) means for providing a voltage pulsating at a frequency proportional to train speed, (d) two resistance means of equivalent resistance value connected in parallel in a Wheatstone bridge arrangement with the extremities of the resistance means constituting input terminals for the bridge arrangement, (e) second stepping switch means operably responsive to said speed proportional pulsating voltage as supplied thereto via a first one of said operating circuits to selectively adjust a first variable tap connector along one of said resistance means, which tap connector constitutes one output terminal of the Wheatstone bridge arrangement, (f) third stepping switch means operably responsive to said speed proportional pulsating voltage as supplied thereto via a second one of said operating circuits to selectively adjust a second variable tap connector along the second of said resistance means, which tap connector constitutes a second output terminal of the Wheatstone bridge arrangement, (g) said first stepping switch means being effective when it establishes a third one of said plurality of operating circuits to cause application of voltage to the input terminals of said Wheatstone bridge arrangement, and (h) control means operably responsive to the difference in potentials established across the output terminals of said Wheatstone bridge arrangement.

References Cited by the Examiner

UNITED STATES PATENTS

| | | | |
|---|---|---|---|
| 2,408,711 | 10/1946 | Volz | 324—70 |
| 2,942,184 | 6/1960 | Sihvonen et al. | 324—70 |
| 3,062,310 | 11/1962 | McCathron et al. | 180—82.1 |
| 3,183,994 | 5/1965 | Goerke et al. | 180—82.1 |
| 3,188,463 | 6/1965 | Hines | 246—182 |

FOREIGN PATENTS 453,203   12/1948   Canada.

ARTHUR L. LA POINT, *Primary Examiner.*

S. B. GREEN, *Assistant Examiner.*